(12) United States Patent
Kücük et al.

(10) Patent No.: US 8,480,190 B2
(45) Date of Patent: Jul. 9, 2013

(54) TWO-PIECE WASHING TANK FOR A DISHWASHER AND A METHOD FOR MANUFACTURING A TWO-PIECE WASHING TANK FOR DISHWASHERS

(75) Inventors: Cengiz Kücük, Syrgenstein (DE); Anton Oppel, Syrgenstein (DE); Manfred Seessle, Gerstetten-Dettingen (DE); Wilhelm Thibaut, Sontheim (DE); Ernst Stickel, Giengen (DE); Klaus Amann, Giengen (DE); Helmut Jerg, Giengen (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 1462 days.

(21) Appl. No.: 10/845,961

(22) Filed: May 14, 2004

(65) Prior Publication Data

US 2005/0017609 A1    Jan. 27, 2005

Related U.S. Application Data

(63) Continuation of application No. PCT/EP02/12220, filed on Oct. 31, 2002.

(30) Foreign Application Priority Data

Nov. 16, 2001 (DE) .................................. 101 56 423

(51) Int. Cl.
   *A47B 77/06* (2006.01)
(52) U.S. Cl.
   USPC ......................................................... 312/228

(58) Field of Classification Search
   USPC ................... 312/228, 236, 279, 265.5, 265.6, 312/257.1, 111, 311, 263, 351.1, 7.2, 7.1; 134/200, 201, 135; 68/3 R
   See application file for complete search history.

(56) References Cited

U.S. PATENT DOCUMENTS

| 1,722,744 | A | * | 7/1929 | Haase | 52/141 |
|---|---|---|---|---|---|
| 3,826,553 | A | * | 7/1974 | Cushing et al. | 312/351.3 |
| 4,098,545 | A | * | 7/1978 | Gaiser et al. | 312/228 |
| 4,572,596 | A | * | 2/1986 | Weir et al. | 312/257.1 |
| 4,618,193 | A | * | 10/1986 | Cuthbert et al. | 312/264 |
| 4,801,181 | A | * | 1/1989 | Cordill et al. | 312/407 |
| 5,125,191 | A | * | 6/1992 | Rhoades | 451/36 |
| 5,299,586 | A | * | 4/1994 | Jordan et al. | 134/111 |
| 5,330,262 | A | * | 7/1994 | Peters | 312/140.4 |
| 5,368,379 | A | | 11/1994 | Wrangberth | |
| 5,605,061 | A | * | 2/1997 | Durazzani | 68/3 R |
| 6,341,830 | B1 | * | 1/2002 | Chun | 312/406.2 |
| 2004/0056575 | A1 | * | 3/2004 | Dietz et al. | 312/408 |
| 2005/0285487 | A1 | * | 12/2005 | Noh | 312/228 |

FOREIGN PATENT DOCUMENTS

| DE | 2416898 A1 | 10/1975 |
|---|---|---|
| DE | 24 20 302 A1 | 11/1975 |
| DE | 3440240 C1 | 3/1986 |

(Continued)

*Primary Examiner* — Janet M Wilkens
(74) *Attorney, Agent, or Firm* — James E. Howard; Andre Pallapies

(57) ABSTRACT

A two-piece washing tank for a dishwasher and a method for manufacturing the two-piece washing tank for a dishwasher. The dishwasher includes a washing container and an assembly base made from plastic. The washing container has a base formed from a substantial portion of the top side of the plastic assembly base and side and rear walls formed substantially of stainless steel.

23 Claims, 5 Drawing Sheets

FOREIGN PATENT DOCUMENTS

| | | |
|---|---|---|
| DE | 4124627 A1 | 1/1993 |
| DE | 100 65 678 A1 | 7/2002 |
| EP | 0 556 787 A1 | 8/1993 |
| WO | 2007020241 * | 2/2007 |

* cited by examiner

TWO-PIECE WASHING TANK FOR A DISHWASHER AND A METHOD FOR MANUFACTURING A TWO-PIECE WASHING TANK FOR DISHWASHERS

BACKGROUND OF THE INVENTION

The invention relates to a dishwasher comprising an assembly base made of plastic and a washing container, as well as a method for connecting a plastic assembly base of a dishwasher to a washing container.

Washing containers made of stainless steel have been known for some time now, whereby the whole body structure of the washing container is extruded from a cylindrical sheet and the rear wall of the washing container is attached to the stainless steel body by means of joining methods, such as for example welding. Once the steel washing container is made it is fixed to a so-called assembly base and the necessary equipment such as pump, sieve etc. Are introduced to the steel washing container or the underlying assembly base, where they are fixed in place. Aside from the material costs for stainless steel the method for manufacturing the steel washing container is time- and cost-intensive and is possible only by means of a plurality of different procedural steps, whereby each of the working steps takes place in different special tools.

BRIEF SUMMARY OF THE INVENTION

The object of the present invention is therefore to provide a dishwasher, or a washing container, which can on the one hand display the advantages of an inert, steel washing container, and on the other hand be manufactured by a rapid method.

This task is solved by the inventive dishwasher having the characteristics according to claim 1, as well as by the inventive method having the characteristics according to claim 12. Advantageous further developments of the invention are characterised in the independent claims.

With the inventive dishwasher, comprising an assembly base made of plastic and a washing container, an essential constituent of the top side of the assembly base is made of plastic and forms the base of the washing container.

According to a preferred embodiment of the invention the side walls of the washing container are designed substantially of stainless steel.

Through the inventive combination of plastic and stainless steel the advantages of stainless steel are used for the side walls, the rear wall and the inner lining of the door, and the advantages of plastic are used to form the base of the washing container, in which several components are to be arranged. In this connection it is particularly advantageous that all connecting arrangements are made on the assembly base already during one manufacturing step and thus there is considerable time economy as compared to conventional methods.

According to a preferred embodiment of the invention the connection areas between the assembly base made of plastic and the washing container made of stainless steel are provided on the side walls and the rear wall of the washing container.

According to a preferred feature of the invention the connection areas are formed by a grooved recess on the assembly base made of plastic and a corresponding insert section on the side walls and the rear wall of the washing container made of stainless steel.

In order to create a watertight and permanent connection between the washing container made of stainless steel and the assembly base made of plastic, in particular with consideration for the lifetime of a dishwasher, the grooved recess is filled with a plastic with adhesive properties, in which the insert section on the side walls and the rear wall of the washing container made of stainless steel immerses and remains.

The plastic with adhesive properties is designed effectively such that due to its viscosity placing it in the grooved recess is technically unproblematic and the processing time of the plastic with adhesive properties can be such that the corresponding insert sections can be attached to the side walls and the rear wall of the washing container made of stainless steel during assembly of the washing container in the grooved recess, which is filled with the plastic with adhesive properties.

By way of advantage the plastic with adhesive properties placed in the grooved recess of the assembly base sets after a certain time, with or without the effect of temperature, and thus forms an undetachable connection, both with the assembly base made of plastic and with the washing container made of stainless steel. The plastic with adhesive properties placed peripherally in the grooved recess of the assembly base and the likewise continuous adhesive connection of the washing container made of stainless steel with the plastic with adhesive properties enables the connection area between the assembly base made of plastic and the washing container made of stainless steel to be watertight.

Apart from these water tightness requirements it is also an advantage of the inventive dishwasher and of the inventive method that there is an aesthetically high-grade connection between the assembly base made of plastic and the washing container made of stainless steel, because for the user, who is able to glimpse only the inner reaches of the washing container, a flush connection between the assembly base made of plastic and the washing container made of stainless steel is perceived, and furthermore this substantially seam-free connection between the assembly base made of plastic and the washing container made of stainless steel forms a hygienic connection, into which no food remains can penetrate.

To improve the connection between the washing container made of stainless steel and the plastic with adhesive properties, which is placed in the grooved recess in the assembly base made of plastic, the insert section on the side walls and the rear wall of the washing container made of stainless steel is provided advantageously with open spaces, through which the viscous plastic with adhesive properties can penetrate into the grooved recess when the insert section is inserted, and thus forms a positive connection between plastic with adhesive properties and the steel insert section apart from the adhesive connection.

The open spaces in the insert section of the washing container are effectively distributed over the entire length and can for example be designed as a longitudinal hole or a cross-vent.

The insert section is designed advantageously V-shaped, whereby a leg of the V merges into the side wall of the washing container and the other leg of the V is designed to be lowered in the grooved recess. Due to this V-shaped configuration it eventuates that the largest possible surface of the insert section comes into contact with the plastic with adhesive properties, and thus on the one hand the tightness and the mechanical grip between the washing container and the assembly base are improved.

It is also possible to form the insert section not V-shaped, but to provide at its end an L- or U-shaped contour, as long as the mechanical properties and sealing requirements can be assured.

BRIEF DESCRIPTION OF THE DRAWINGS

The invention will now be explained hereinbelow in greater detail by means of the diagrams, in which.

DETAILED DESCRIPTION OF THE INVENTION

Figure 1:
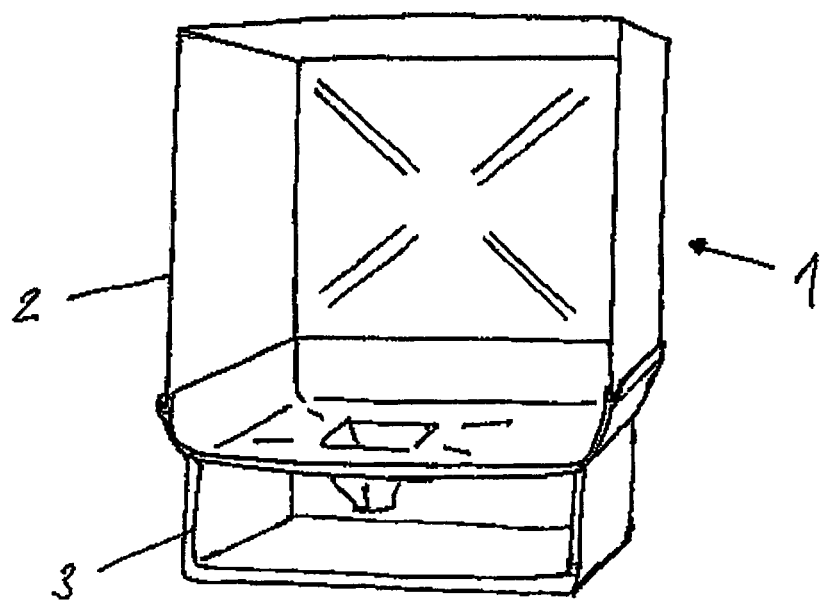
FIG. 1 is a perspective view of a section through a basic body of the inventive dishwasher or inventive washing container with mounted assembly base.

In the arrangement according to FIG. 1 a basic body of a dishwasher 1 according to the present invention is illustrated, comprising an assembly base 3 and a washing container 2.

Due to the compact manufacturing process of the assembly base 3 it is possible in a single work procedure to manufacture the assembly base 3, advantageously comprising plastic, monobloc, for example in an injection moulding process. With this efficient manufacturing method it can be ensured that all connection areas, such as for example pump, lye pump, filter etc. are fitted with connection possibilities, so that the washing container 2 would have to display only a few necessary more connection possibilities. Aside form the option illustrated in FIG. 1 of creating the connection area between assembly base 3 and washing container 2 via a leg of certain height, it is likewise possible to arrange the connection area directly on the top side of the assembly base 3, so that only the top side of the assembly base 3 forms the base of the washing container.

Figure 2:
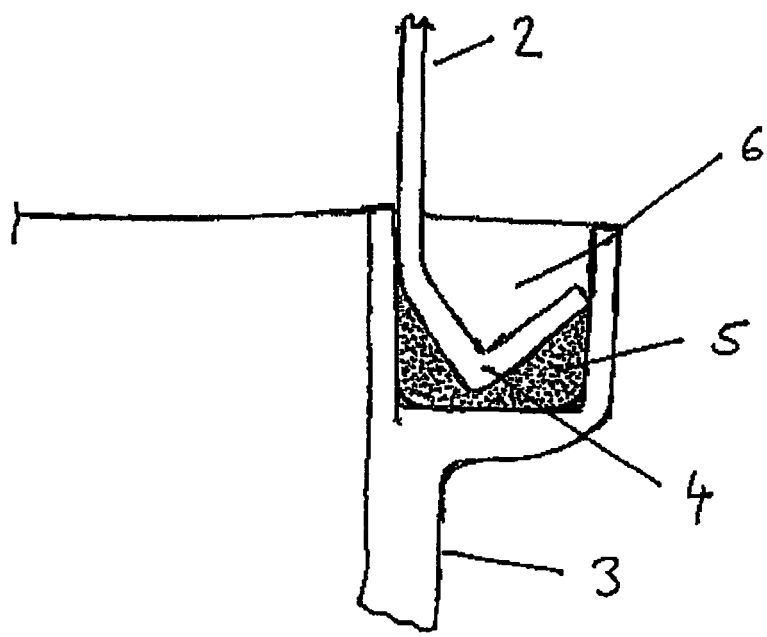
FIG. 2 is an enlarged sectional view through the connection area between washing container and assembly base, whereby the insert section is V-shaped.

The enlarged detail view of the connection areas according to FIG. 2 illustrates the grooved recess 6 on the assembly base 3, as well as the plastic 5 with adhesive properties provided for sealing between washing container 2 and assembly base 3. In preparation for assembly the plastic 5 with adhesive properties is placed in the grooved recess 6 of the assembly base 3, whereby the latter is e.g. in the form of a strand or is extruded as a strand, to ensure that the plastic 5 with adhesive properties is laid out continuously in the grooved recess 6. The plastic 5 with adhesive properties is in viscous form, or is brought to viscous form e.g. by heating and the insert section 4 of the washing container 2 is pressed into the viscous plastic 5 with adhesive properties, so that the latter spreads out in the grooved recess 6 of the assembly base 3, thus forming a watertight connection between the assembly base 3 and the insert section 4.

Figure 3:
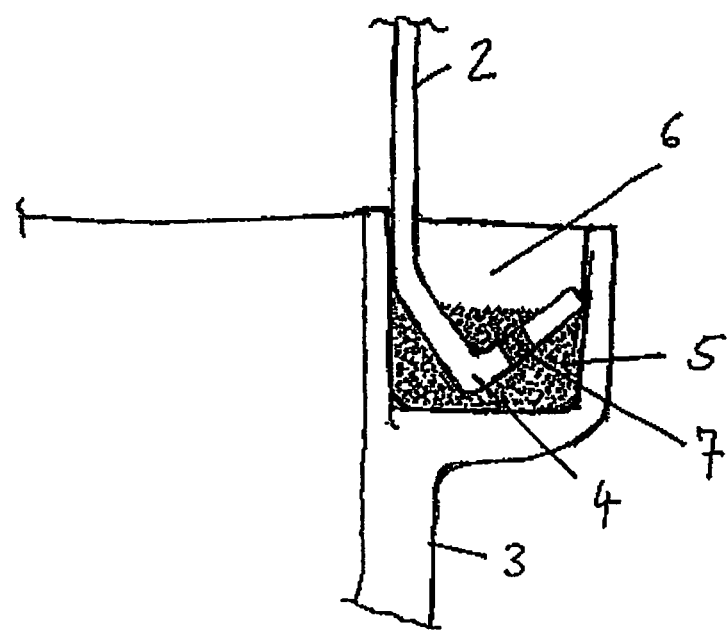
FIG. 3 is an enlarged sectional view through the insert section according to FIG. 2, but whereby the insert section has open spaces.

According to an advantageous embodiment of the invention the insert section 6 is provided with open spaces 7, as shown in FIG. 3, so that the viscous plastic 5 with adhesive properties is pressed through these open spaces 7 during pressing of the insert section 4, and thus forms a positive connection with the insert section 4 of the washing container 2 after the plastic 5 with adhesive properties hardens.

In assembling the washing container 2 care should always be taken that the processing of the plastic 5 with adhesive properties within the grooved recess 6 progresses such that no air chambers develop, which might negatively influence the water tightness.

Figure 4:
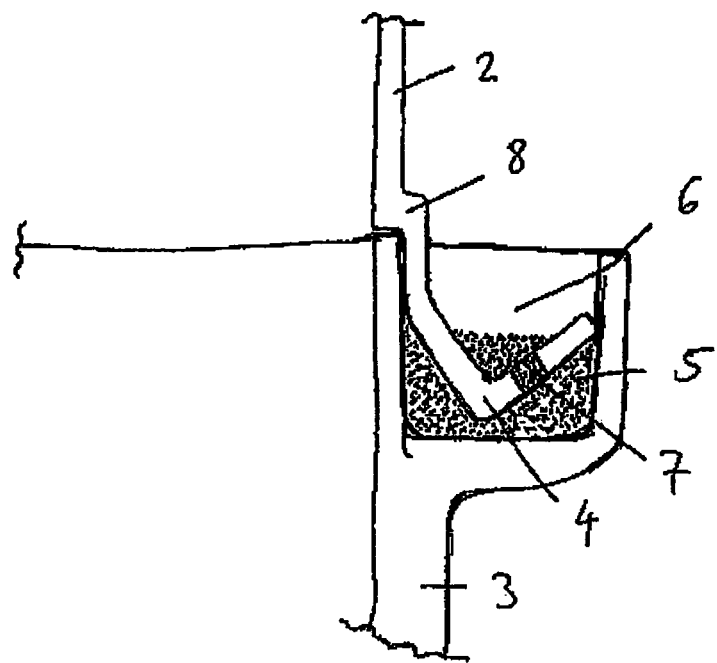
FIG. 4 is an enlarged sectional view through the insert section, whereby the inner surface of the washing container is designed substantially free of a step.

As shown in the arrangement according to FIG. 4, in a further advantageous embodiment of the present invention a step 8 is made in the side walls and rear wall of the washing container 2, which is arranged and formed such that after assembly a substantially flush surface can be perceived in the interior of the washing container. By way of advantage and aside from aesthetic considerations the step 8 also serves as justification during the assembly process, since the washing container 2 can be set on the step 8, while the insert section 4 is inserted into the viscous plastic 5 with adhesive properties, thus forming a predetermined holding position of the insert section 4.

Figure 5:
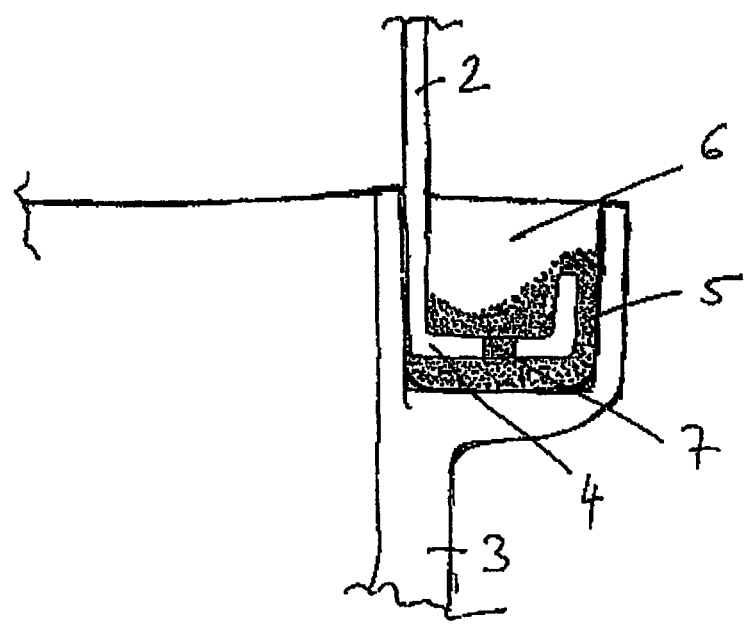
FIG. 5 is an enlarged sectional view through the connection area, whereby the insert section is designed U-shaped with open spaces.

In a further advantageous embodiment according to FIG. 5 an insert section 4 is designed U-shaped and is of such a size that while the insert section 4 is pressed into the grooved recess 6 of the assembly base 3 the viscous plastic 5 with adhesive properties can flow past the insert section 4 and thus form a virtually complete covering of the insert section 4, so that the mechanical connection between washing container 2 and assembly base 3 is increased as compared to other embodiments, and the water tightness can be fixed in addition by simple optical examination.

In a preferred embodiment of the present invention the adhesive Sikaflex-221$^{(R)}$ by Sika Industry is used, but other individual constituents of polyurethane adhesives can also be used.

Sikaflex-221$^{(R)}$ is advantageously processed such that after a period of 45 to 60 minutes a skin forms and the washing container made of stainless steel has assumed its exact position, in which it remains until the adhesive cures. The cure rate in the Sikaflex-221$^{(R)}$ adhesive is 3 mm/24 h on average.

Using adhesive ensures that the operating temperatures of the dishwasher do not negatively influence sealing properties and mechanical properties of the connection. The maximum operating temperature in the plastic with adhesive properties at the highest operating temperatures of the dishwasher is ca. 80 to 90° C.

The invention claimed is:

1. A dishwasher, comprising:
   a washing container including side walls formed substantially of stainless steel and a rear wall formed substantially of stainless steel;
   an assembly base made from plastic; and
   said washing container including a base formed from a substantial portion of the top side of said plastic assembly base and including connection areas between said plastic assembly base and said side walls and said rear wall of said washing container, said connection areas including a groove formed in said plastic assembly base and stainless steel insert sections for disposition within said groove, said insert sections being formed on said stainless steel side walls and extending continuously therealong; and said stainless steel rear wall of said washing container and extending continuously therealong, said groove having an adhesive property plastic disposed therein and said stainless steel insert sections formed on said stainless steel side walls and said stainless steel rear wall are inserted into said adhesive property plastic in said groove, and said stainless steel insert sections are bevelled into a substantially V-shaped section, which V-shaped sections are inserted into said adhesive property plastic in said groove, displacing said adhesive property plastic to form a substantially non-detachable watertight connection with said plastic assembly base.

2. The dishwasher according to claim 1 including said stainless steel insert sections formed on said stainless steel side walls and said stainless steel rear wall include open spaces formed therein and said adhesive property plastic penetrates said open spaces.

3. The dishwasher according to claim 1, including said connection areas on the inside of said washing container include a single step forming a transition region between said stainless steel walls and said plastic assembly base.

4. The dishwasher according to claim 1, including said connection areas on the inside of said washing container form a substantially flush transition region surface between said stainless steel walls and said plastic assembly base.

5. The dishwasher of claim 1, wherein the side walls of the washing container and the rear wall of the washing container each have an inner surface facing an interior of the washing container, and
   wherein the channel portion has an inner surface that is substantially flush with the inner surface of the respective side walls and the rear wall of the washing container.

6. A dishwasher, comprising:
   an assembly base made of plastic and having a top side;
   a washing container, a portion of the top side of the assembly base forming a lower portion of the washing container and the washing container having side walls formed substantially of stainless steel and a rear wall formed substantially of stainless steel, the side walls and the rear wall of the washing container defining, together with the assembly base, a connection area, and the connection area being formed of an open-topped receiving structure on the assembly base configured for receiving the side walls and the rear wall of the washing container; and
   an adhesive property plastic disposed in the open-topped receiving structure on the assembly base continuously therealong, the side walls and the rear wall of the washing container being seated in the open-topped receiving structure on the assembly base continuously therealong and the adhesive property plastic adhesively interconnecting the assembly base and the washing container continuously within the open-topped receiving structure on the assembly base.

7. The dishwasher according to claim 6, wherein the side walls and the rear wall of the washing container are seated in the open-topped receiving structure on the assembly base such that the adhesive property plastic extends vertically along inner and outer portions of each of the side walls and the rear wall of the washing container within the open-topped receiving structure on the assembly base.

8. The dishwasher according to claim 6, wherein portions of the side walls and the rear wall of the washing container seated in the open-topped receiving structure on the assembly base are provided with breakout apertures through which the adhesive property plastic extends.

9. The dishwasher according to claim 6, wherein the portions of the side walls and the rear wall of the washing container seated in the open-topped receiving structure on the assembly base include a single step delimiting a transition area between the washing container and the assembly base.

10. The dishwasher according to claim 6, wherein the portions of the side walls and the rear wall of the washing container seated in the open-topped receiving structure on the assembly base are free of any steps delimiting a transition area between the washing container and the assembly base.

11. The dishwasher according to claim 6, wherein the portions of the side walls and the rear wall of the washing container seated in the open-topped receiving structure on the assembly base have a substantially V-shaped cross section and the adhesive property plastic extends vertically along inner surfaces and outer surfaces of these portions of the side walls and the rear wall of the washing container having a substantially V-shaped cross section.

12. The dishwasher according to claim 6, wherein the open-topped receiving structure on the assembly base is formed as a horizontal groove.

13. The dishwasher according to claim 6, wherein the adhesive property plastic extends substantially without any gap along the entirety of the open-topped receiving structure on the assembly base to form a barrier that reduces the migration therepast of fluid from the interior of the dishwasher to the exterior.

14. The dishwasher of claim 6, wherein the side walls of the washing container and the rear wall of the washing container each have an inner surface facing an interior of the washing container, and
   wherein the channel portion has an inner surface that is substantially flush with the inner surface of the respective side walls and the rear wall of the washing container.

15. A dishwasher, comprising:
   an assembly base made of plastic and having a top side;
   a washing container, a portion of the top side of the assembly base forming a lower portion of the washing container and the washing container having side walls formed substantially of stainless steel and a rear wall formed substantially of stainless steel and the side walls and the rear wall of the washing container being disposed on the assembly base such that the washing container and the assembly base together form a structure having a pair of side walls, a rear side wall, and a bottom wall; and
   means for sealing the walls of the structure continuously therealong against the migration of fluid therepast, the means for sealing including an open-topped receiving structure on the assembly base that receives the side walls and the rear wall of the washing container continuously therealong and an adhesive property plastic disposed in the open-topped receiving structure on the assembly base continuously therealong, the side walls and the rear wall of the washing container being seated in the open-topped receiving structure on the assembly base continuously therealong and the adhesive property plastic adhesively interconnecting the assembly base and the washing container within the open-topped receiving structure on the assembly base continuously therealong.

16. The dishwasher according to claim 15, wherein the side walls and the rear wall of the washing container are seated in the open-topped receiving structure on the assembly base such that the adhesive property plastic extends vertically along inner and outer portions of each of the side walls and the rear wall of the washing container within the open-topped receiving structure on the assembly base.

17. The dishwasher according to claim 15, wherein portions of the side walls and the rear wall of the washing container seated in the open-topped receiving structure on the assembly base are provided with breakout apertures through which the adhesive property plastic extends.

18. The dishwasher according to claim 15, wherein the portions of the side walls and the rear wall of the washing container seated in the open-topped receiving structure on the assembly base include a single step delimiting a transition area between the washing container and the assembly base.

19. The dishwasher according to claim 15, wherein the open-topped receiving structure on the assembly base is formed as a horizontal groove.

20. The dishwasher according to claim 15, wherein the adhesive property plastic extends substantially without any gap along the entirety of the open-topped receiving structure on the assembly base to form a barrier that reduces the migration therepast of fluid from the interior of the dishwasher to the exterior.

21. The dishwasher of claim 15, wherein the side walls of the washing container and the rear wall of the washing container each have an inner surface facing an interior of the washing container, and
wherein the channel portion has an inner surface that is substantially flush with the inner surface of the respective side walls and the rear wall of the washing container.

22. A dishwasher, comprising:
a washing container including side walls formed substantially of stainless steel and a rear wall formed substantially of stainless steel;
an assembly base made from plastic; and
said washing container including a base formed from a substantial portion of the top side of said plastic assembly base and including connection areas between said plastic assembly base and said side walls and said rear wall of said washing container, said connection areas including a channel portion forming a groove on said plastic assembly base and stainless steel insert sections for disposition within said groove, said insert sections being formed on said stainless steel side walls and extending continuously therealong; and said stainless steel rear wall of said washing container and extending continuously therealong, said groove having an adhesive property plastic disposed therein and said stainless steel insert sections formed on said stainless steel side walls and said stainless steel rear wall are inserted into said adhesive property plastic in said groove, and said stainless steel insert sections are bevelled into a substantially V-shaped section, which V-shaped sections are inserted into said adhesive property plastic in said groove, displacing said adhesive property plastic to form a substantially non-detachable watertight connection with said plastic assembly base, the side walls of said washing container and the rear wall of said washing container each having an inner surface and said channel portion having an inner surface that is substantially flush with the inner surfaces of the respective side walls and the rear wall of said washing container.

23. The dishwasher according to claim 22, including said channel portion forming said groove includes an inner channel wall and an outer channel wall extending to substantially the same height as the height of said inner channel wall.

* * * * *